US008204252B1

(12) United States Patent
Avendano

(10) Patent No.: US 8,204,252 B1
(45) Date of Patent: Jun. 19, 2012

(54) SYSTEM AND METHOD FOR PROVIDING CLOSE MICROPHONE ADAPTIVE ARRAY PROCESSING

(75) Inventor: Carlos Avendano, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 1066 days.

(21) Appl. No.: 12/080,115

(22) Filed: Mar. 31, 2008

Related U.S. Application Data

(63) Continuation-in-part of application No. 11/699,732, filed on Jan. 29, 2007.

(60) Provisional application No. 60/850,928, filed on Oct. 10, 2006.

(51) Int. Cl.
*H04B 15/00* (2006.01)
*G10L 21/02* (2006.01)

(52) U.S. Cl. ..................... 381/94.7; 381/94.1; 381/94.2; 381/94.3; 381/92; 704/226; 704/227; 704/223; 704/275

(58) Field of Classification Search .................... 381/91, 381/92, 94.1–94.3, 94.7, 95, 110, 122, 312, 381/313; 704/226, 227, 233, 275
See application file for complete search history.

(56) References Cited

U.S. PATENT DOCUMENTS

| | | | |
|---|---|---|---|
| 3,976,863 | A | 8/1976 | Engel |
| 3,978,287 | A | 8/1976 | Fletcher et al. |
| 4,137,510 | A | 1/1979 | Iwahara |
| 4,433,604 | A | 2/1984 | Ott |
| 4,516,259 | A | 5/1985 | Yato et al. |
| 4,535,473 | A | 8/1985 | Sakata |
| 4,536,844 | A | 8/1985 | Lyon |
| 4,581,758 | A | 4/1986 | Coker et al. |
| 4,628,529 | A | 12/1986 | Borth et al. |
| 4,630,304 | A | 12/1986 | Borth et al. |
| 4,649,505 | A | 3/1987 | Zinser, Jr. et al. |
| 4,658,426 | A | 4/1987 | Chabries et al. |
| 4,674,125 | A | 6/1987 | Carlson et al. |
| 4,718,104 | A | 1/1988 | Anderson |

(Continued)

FOREIGN PATENT DOCUMENTS

JP 62110349 5/1987

(Continued)

OTHER PUBLICATIONS

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

(Continued)

*Primary Examiner* — Vivian Chin
*Assistant Examiner* — Paul Kim
(74) *Attorney, Agent, or Firm* — Carr & Ferrell LLP

(57) ABSTRACT

Systems and methods for adaptive processing of a close microphone array in a noise suppression system are provided. A primary acoustic signal and a secondary acoustic signal are received. In exemplary embodiments, a frequency analysis is performed on the acoustic signals to obtain frequency sub-band signals. An adaptive equalization coefficient may then be applied to a sub-band signal of the secondary acoustic signal. A forward-facing cardioid pattern and a backward-facing cardioid pattern are then generated based on the sub-band signals. Utilizing cardioid signals of the forward-facing cardioid pattern and backward-facing cardioid pattern, noise suppression may be performed. A resulting noise suppressed signal is output.

21 Claims, 8 Drawing Sheets

U.S. PATENT DOCUMENTS 4,811,404 A 3/1989 Vilmur et al.
4,812,996 A 3/1989 Stubbs
4,864,620 A 9/1989 Bialick
4,920,508 A 4/1990 Yassaie et al.
5,027,410 A 6/1991 Williamson et al.
5,054,085 A 10/1991 Meisel et al.
5,058,419 A 10/1991 Nordstrom et al.
5,099,738 A 3/1992 Hotz
5,119,711 A 6/1992 Bell et al.
5,142,961 A 9/1992 Paroutaud
5,150,413 A 9/1992 Nakatani et al.
5,175,769 A 12/1992 Hejna, Jr. et al.
5,187,776 A 2/1993 Yanker
5,208,864 A 5/1993 Kaneda
5,210,366 A 5/1993 Sykes, Jr.
5,224,170 A 6/1993 Waite, Jr.
5,230,022 A 7/1993 Sakata
5,319,736 A 6/1994 Hunt
5,323,459 A 6/1994 Hirano
5,341,432 A 8/1994 Suzuki et al.
5,381,473 A 1/1995 Andrea et al.
5,381,512 A 1/1995 Holton et al.
5,400,409 A 3/1995 Linhard
5,402,493 A 3/1995 Goldstein
5,402,496 A 3/1995 Soli et al.
5,471,195 A 11/1995 Rickman
5,473,702 A 12/1995 Yoshida et al.
5,473,759 A 12/1995 Slaney et al.
5,479,564 A 12/1995 Vogten et al.
5,502,663 A 3/1996 Lyon
5,536,844 A 7/1996 Wijesekera
5,544,250 A 8/1996 Urbanski
5,574,824 A 11/1996 Slyh et al.
5,583,784 A 12/1996 Kapust et al.
5,587,998 A 12/1996 Velardo, Jr. et al.
5,590,241 A 12/1996 Park et al.
5,602,962 A 2/1997 Kellermann
5,675,778 A 10/1997 Jones
5,682,463 A 10/1997 Allen et al.
5,694,474 A 12/1997 Ngo et al.
5,706,395 A 1/1998 Arslan et al.
5,717,829 A 2/1998 Takagi
5,729,612 A 3/1998 Abel et al.
5,732,189 A 3/1998 Johnston et al.
5,749,064 A 5/1998 Pawate et al.
5,757,937 A 5/1998 Itoh et al.
5,792,971 A 8/1998 Timis et al.
5,796,819 A 8/1998 Romesburg
5,806,025 A 9/1998 Vis et al.
5,809,463 A 9/1998 Gupta et al.
5,825,320 A 10/1998 Miyamori et al.
5,839,101 A 11/1998 Vahatalo et al.
5,920,840 A 7/1999 Satyamurti et al.
5,933,495 A 8/1999 Oh
5,943,429 A 8/1999 Handel
5,956,674 A 9/1999 Smyth et al.
5,974,380 A 10/1999 Smyth et al.
5,978,824 A 11/1999 Ikeda
5,983,139 A 11/1999 Zierhofer
5,990,405 A 11/1999 Auten et al.
6,002,776 A 12/1999 Bhadkamkar et al.
6,061,456 A 5/2000 Andrea et al.
6,072,881 A 6/2000 Linder
6,097,820 A 8/2000 Turner
6,108,626 A 8/2000 Cellario et al.
6,122,610 A 9/2000 Isabelle
6,134,524 A 10/2000 Peters et al.
6,137,349 A 10/2000 Menkhoff et al.
6,140,809 A 10/2000 Doi
6,173,255 B1 1/2001 Wilson et al.
6,180,273 B1 1/2001 Okamoto
6,216,103 B1 4/2001 Wu et al.
6,222,927 B1 4/2001 Feng et al.
6,223,090 B1 4/2001 Brungart
6,226,616 B1 5/2001 You et al.
6,263,307 B1 7/2001 Arslan et al.
6,266,633 B1 7/2001 Higgins et al.
6,317,501 B1 11/2001 Matsuo
6,339,758 B1 1/2002 Kanazawa et al.
6,355,869 B1 3/2002 Mitton
6,363,345 B1 3/2002 Marash et al.
6,381,570 B2 4/2002 Li et al.
6,430,295 B1 8/2002 Handel et al.
6,434,417 B1 8/2002 Lovett
6,449,586 B1 9/2002 Hoshuyama
6,469,732 B1 10/2002 Chang et al.
6,487,257 B1 11/2002 Gustafsson et al.
6,496,795 B1 12/2002 Malvar
6,513,004 B1 1/2003 Rigazio et al.
6,516,066 B2 2/2003 Hayashi
6,529,606 B1 3/2003 Jackson, Jr., II et al.
6,549,630 B1 4/2003 Bobisuthi
6,584,203 B2 6/2003 Elko et al.
6,622,030 B1 9/2003 Romesburg et al.
6,717,991 B1 4/2004 Nordholm et al.
6,718,309 B1 4/2004 Selly
6,738,482 B1 5/2004 Jaber
6,760,450 B2 7/2004 Matsuo
6,785,381 B2 8/2004 Gartner et al.
6,792,118 B2 9/2004 Watts
6,795,558 B2 9/2004 Matsuo
6,798,886 B1 9/2004 Smith et al.
6,810,273 B1 10/2004 Mattila et al.
6,882,736 B2 4/2005 Dickel et al.
6,915,264 B2 7/2005 Baumgarte
6,917,688 B2 7/2005 Yu et al.
6,944,510 B1 9/2005 Ballesty et al.
6,978,159 B2 12/2005 Feng et al.
6,982,377 B2 1/2006 Sakurai et al.
6,999,582 B1 2/2006 Popovic et al.
7,016,507 B1 3/2006 Brennan
7,020,605 B2 3/2006 Gao
7,031,478 B2 4/2006 Belt et al.
7,054,452 B2 5/2006 Ukita
7,065,485 B1 6/2006 Chong-White et al.
7,076,315 B1 7/2006 Watts
7,092,529 B2 8/2006 Yu et al.
7,092,882 B2 8/2006 Arrowood et al.
7,099,821 B2 8/2006 Visser et al.
7,142,677 B2 11/2006 Gonopolskiy et al.
7,146,316 B2 12/2006 Alves
7,155,019 B2 12/2006 Hou
7,164,620 B2 1/2007 Hoshuyama
7,171,008 B2 1/2007 Elko
7,171,246 B2 1/2007 Mattila et al.
7,174,022 B1 2/2007 Zhang et al.
7,206,418 B2 4/2007 Yang et al.
7,209,567 B1 4/2007 Kozel et al.
7,225,001 B1 5/2007 Eriksson et al.
7,242,762 B2 7/2007 He et al.
7,246,058 B2 7/2007 Burnett
7,254,242 B2 8/2007 Ise et al.
7,359,520 B2 4/2008 Brennan et al.
7,412,379 B2 8/2008 Taori et al.
7,433,907 B2 10/2008 Nagai et al.
7,555,434 B2 6/2009 Nomura et al.
7,949,522 B2 5/2011 Hetherington et al.
2001/0016020 A1 8/2001 Gustafsson et al.
2001/0031053 A1 10/2001 Feng et al.
2002/0002455 A1 1/2002 Accardi et al.
2002/0009203 A1 1/2002 Erten
2002/0041693 A1 4/2002 Matsuo
2002/0080980 A1 6/2002 Matsuo
2002/0106092 A1 8/2002 Matsuo
2002/0116187 A1 8/2002 Erten
2002/0133334 A1 9/2002 Coorman et al.
2002/0147595 A1 10/2002 Baumgarte
2002/0184013 A1 12/2002 Walker
2003/0014248 A1 1/2003 Vetter
2003/0026437 A1 2/2003 Janse et al.
2003/0033140 A1 2/2003 Taori et al.
2003/0039369 A1 2/2003 Bullen
2003/0040908 A1 2/2003 Yang et al.
2003/0061032 A1 3/2003 Gonopolskiy
2003/0063759 A1 4/2003 Brennan et al.
2003/0072382 A1 4/2003 Raleigh et al.
2003/0072460 A1 4/2003 Gonopolskiy et al.

| | | | | |
|---|---|---|---|---|
| 2003/0095667 | A1 | 5/2003 | Watts | |
| 2003/0099345 | A1 | 5/2003 | Gartner et al. | |
| 2003/0101048 | A1 | 5/2003 | Liu | |
| 2003/0103632 | A1 | 6/2003 | Goubran et al. | |
| 2003/0128851 | A1 | 7/2003 | Furuta | |
| 2003/0138116 | A1 | 7/2003 | Jones et al. | |
| 2003/0147538 | A1* | 8/2003 | Elko | 381/92 |
| 2003/0169891 | A1 | 9/2003 | Ryan et al. | |
| 2003/0228023 | A1 | 12/2003 | Burnett et al. | |
| 2004/0013276 | A1 | 1/2004 | Ellis et al. | |
| 2004/0047464 | A1 | 3/2004 | Yu et al. | |
| 2004/0057574 | A1 | 3/2004 | Faller | |
| 2004/0078199 | A1 | 4/2004 | Kremer et al. | |
| 2004/0131178 | A1 | 7/2004 | Shahaf et al. | |
| 2004/0133421 | A1 | 7/2004 | Burnett et al. | |
| 2004/0165736 | A1 | 8/2004 | Hetherington et al. | |
| 2004/0196989 | A1 | 10/2004 | Friedman et al. | |
| 2004/0263636 | A1 | 12/2004 | Cutler et al. | |
| 2005/0025263 | A1 | 2/2005 | Wu | |
| 2005/0027520 | A1 | 2/2005 | Mattila et al. | |
| 2005/0049864 | A1 | 3/2005 | Kaltenmeier et al. | |
| 2005/0060142 | A1 | 3/2005 | Visser et al. | |
| 2005/0152559 | A1 | 7/2005 | Gierl et al. | |
| 2005/0185813 | A1 | 8/2005 | Sinclair et al. | |
| 2005/0213778 | A1 | 9/2005 | Buck et al. | |
| 2005/0216259 | A1 | 9/2005 | Watts | |
| 2005/0228518 | A1 | 10/2005 | Watts | |
| 2005/0276423 | A1 | 12/2005 | Aubauer et al. | |
| 2005/0288923 | A1 | 12/2005 | Kok | |
| 2006/0072768 | A1 | 4/2006 | Schwartz et al. | |
| 2006/0074646 | A1 | 4/2006 | Alves et al. | |
| 2006/0098809 | A1 | 5/2006 | Nongpiur et al. | |
| 2006/0120537 | A1 | 6/2006 | Burnett et al. | |
| 2006/0133621 | A1 | 6/2006 | Chen et al. | |
| 2006/0149535 | A1 | 7/2006 | Choi et al. | |
| 2006/0184363 | A1 | 8/2006 | McCree et al. | |
| 2006/0198542 | A1 | 9/2006 | Benjelloun Touimi et al. | |
| 2006/0222184 | A1 | 10/2006 | Buck et al. | |
| 2007/0021958 | A1 | 1/2007 | Visser et al. | |
| 2007/0027685 | A1 | 2/2007 | Arakawa et al. | |
| 2007/0033020 | A1 | 2/2007 | (Kelleher) Francois et al. | |
| 2007/0067166 | A1 | 3/2007 | Pan et al. | |
| 2007/0078649 | A1 | 4/2007 | Hetherington et al. | |
| 2007/0094031 | A1 | 4/2007 | Chen | |
| 2007/0100612 | A1 | 5/2007 | Ekstrand et al. | |
| 2007/0116300 | A1 | 5/2007 | Chen | |
| 2007/0150268 | A1 | 6/2007 | Acero et al. | |
| 2007/0154031 | A1 | 7/2007 | Avendano et al. | |
| 2007/0165879 | A1 | 7/2007 | Deng et al. | |
| 2007/0195968 | A1 | 8/2007 | Jaber | |
| 2007/0230712 | A1 | 10/2007 | Belt et al. | |
| 2007/0276656 | A1 | 11/2007 | Solbach et al. | |
| 2008/0019548 | A1 | 1/2008 | Avendano | |
| 2008/0033723 | A1 | 2/2008 | Jang et al. | |
| 2008/0140391 | A1 | 6/2008 | Yen et al. | |
| 2008/0201138 | A1 | 8/2008 | Visser et al. | |
| 2008/0228478 | A1 | 9/2008 | Hetherington et al. | |
| 2008/0260175 | A1 | 10/2008 | Elko | |
| 2009/0012783 | A1 | 1/2009 | Klein | |
| 2009/0012786 | A1 | 1/2009 | Zhang et al. | |
| 2009/0129610 | A1 | 5/2009 | Kim et al. | |
| 2009/0220107 | A1 | 9/2009 | Every et al. | |
| 2009/0238373 | A1 | 9/2009 | Klein | |
| 2009/0253418 | A1 | 10/2009 | Makinen | |
| 2009/0271187 | A1 | 10/2009 | Yen et al. | |
| 2009/0323982 | A1 | 12/2009 | Solbach et al. | |
| 2010/0094643 | A1 | 4/2010 | Avendano et al. | |
| 2010/0278352 | A1 | 11/2010 | Petit et al. | |
| 2011/0178800 | A1 | 7/2011 | Watts | |

FOREIGN PATENT DOCUMENTS

| | | |
|---|---|---|
| JP | 4184400 | 7/1992 |
| JP | 5053587 | 3/1993 |
| JP | 05-172865 | 7/1993 |
| JP | 6269083 | 9/1994 |
| JP | 10-313497 | 11/1998 |
| JP | 11-249693 | 9/1999 |
| JP | 2004053895 | 2/2004 |
| JP | 2004531767 | 10/2004 |
| JP | 2004533155 | 10/2004 |
| JP | 2005110127 | 4/2005 |
| JP | 2005148274 | 6/2005 |
| JP | 2005518118 | 6/2005 |
| JP | 2005195955 | 7/2005 |
| WO | 01/74118 | 10/2001 |
| WO | 02080362 | 10/2002 |
| WO | 02103676 | 12/2002 |
| WO | 03/043374 | 5/2003 |
| WO | 03/069499 | 8/2003 |
| WO | 03069499 | 8/2003 |
| WO | 2004/010415 | 1/2004 |
| WO | 2007/081916 | 7/2007 |
| WO | 2007/140003 | 12/2007 |
| WO | 2010/005493 | 1/2010 |

OTHER PUBLICATIONS

Allen, Jont B. et al. "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al. "Suppression of Acoustic Noise in Speech Using Two Microphone Adaptive Noise Cacellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al. "New Insights into the Noise Reduction Wiener Filter", IEEE Transactions on Audio, Speech, and Language Processing. vol. 14, No. 4, Jul. 2006, pp. 1218-1234.

Cohen, Israel, et al. "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.

Fuchs, Martin et al. "Noise Suppression for Automotive Applications Based on Directional Information", 2004 IEEE International Conference on Acoustics, Speech, and Signal Processing, May 17-21, pp. 237-240.

Fulghum, D. P. et al., "LPC Voice Digitizer with Background Noise Suppression", 1979 IEEE International Conference on Acoustics, Speech, and Signal Processing, pp. 220-223.

Goubran, R.A.. "Acoustic Noise Suppression Using Regression Adaptive Filtering", 1990 IEEE 40th Vehicular Technology Conference, May 6-9, pp. 48-53.

Graupe et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.

Haykin, Simon et al. "Appendix A.2 Complex Numbers." Signals and Systems. 2nd Ed. 2003. p. 764.

Hermansky, Hynek "Should Recognizers Have Ears?", In Proc. ESCA Tutorial and Research Workshop on Robust Speech Recognition for Unknown Communication Channels, pp. 1-10, France 1997.
Hohmann, V. "Frequency Analysis and Synthesis Using a Gammatone Filterbank", ACTA Acustica United with Acustica, 2002, vol. 88, pp. 433-442.
Jeffress Lloyd A, "A Place Theory of Sound Localization," Journal of Comparative and Physiological Psychology, 1948, vol. 41, p. 35-39.
Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.
Kates, James M. "A Time-Domain Digital Cochlear Model", IEEE Transactions on Signal Proccessing, Dec. 1991, vol. 39, No. 12, pp. 2573-2592.
Lazzaro John et al., "A Silicon Model of Auditory Localization," Neural Computation Spring 1989, vol. 1, pp. 47-57, Massachusetts Institute of Technology.
Lippmann, Richard P. "Speech Recognition by Machines and Humans", Speech Communication, Jul. 1997, vol. 22, No. 1, pp. 1-15.
Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.
Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug 1994, pp. 429-438.
Martin, Rainer "Spectral Subtraction Based on Minimum Statistics", in Proceedings Europe. Signal Processing Conf., 1994, pp. 1182-1185.
Mitra, Sanjit K. Digital Signal Processing: a Computer-based Approach. 2nd Ed. 2001. pp. 131-133.
Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.
Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.
Watts, Lloyd Narrative of Prior Disclosure of Audio Display on Feb. 15, 2000 and May 31, 2000.
Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Parra, Lucas et al. "Convolutive Blind Separation of Non-Stationary Sources", IEEE Transactions on Speech and Audio Processing. vol. 8, 3, May 2008, pp. 320-327.
Rabiner, Lawrence R. et al. "Digital Processing of Speech Signals", (Prentice-Hall Series in Signal Processing). Upper Saddle River, NJ: Prentice Hall, 1978.
Weiss, Ron et al., "Estimating Single-Channel Source Separation Masks: Revelance Vector Machine Classifiers vs. Pitch-Based Masking", Workshop on Statistical and Perceptual Audio Processing, 2006.
Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, "Lyon's Cochlear Model", Advanced Technology Group, Apple Technical Report #13, Apple Computer, Inc., 1988, pp. 1-79.
Slaney, Malcom, et al. "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Syntrillium Software Corporation, "Cool Edit User's Manual", 1996, pp. 1-74.
Tashev, Ivan et al. "Microphone Array for Headset with Spatial Noise Suppressor", http://research.microsoft.com/users/ivantash/Documents/Tashev_MAforHeadset_HSCMA_05.pdf. (4 pages).
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Watts, Lloyd, "Robust Hearing Systems for Intelligent Machines," Applied Neurosystems Corporation, 2001, pp. 1-5.
Widrow, B. et al., "Adaptive Antenna Systems," Proceedings IEEE, vol. 55, No. 12, pp. 2143-2159, Dec. 1967.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
International Search Report dated Jun. 8, 2001 in Application No. PCT/US01/08372.
International Search Report dated Apr. 3, 2003 in Application No. PCT/US02/36946.
International Search Report dated May 29, 2003 in Application No. PCT/US03/04124.
International Search Report and Written Opinion dated Oct. 19, 2007 in Application No. PCT/US07/00463.
International Search Report and Written Opinion dated Apr. 9, 2008 in Application No. PCT/US07/21654.
International Search Report and Written Opinion dated Sep. 16, 2008 in Application No. PCT/US07/12628.
International Search Report and Written Opinion dated Oct. 1, 2008 in Application No. PCT/US08/08249.
International Search Report and Written Opinion dated May 11, 2009 in Application No. PCT/US09/01667.
International Search Report and Written Opinion dated Aug. 27, 2009 in Application No. PCT/US09/03813.
International Search Report and Written Opinion dated May 20, 2010 in Application No. PCT/US09/06754.
Fast Cochlea Transform, US Trademark Reg. No. 2,875,755 (Aug. 17, 2004).
Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.
Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.
Laroche, "Time and Pitch Scale Modification of Audio Signals", in "Applications of Digital Signal Processing to Audio and Acoustics", The Kluwer International Series in Engineering and Computer Science, vol. 437, pp. 279-309, 2002.
Moulines, Eric et al., "Non-Parametric Techniques for Pitch-Scale and Time-Scale Modification of Speech", Speech Communication, vol. 16, pp. 175-205, 1995.
Verhelst, Werner, "Overlap-Add Methods for Time-Scaling of Speech", Speech Communication vol. 30, pp. 207-221, 2000.

* cited by examiner

SYSTEM AND METHOD FOR PROVIDING CLOSE MICROPHONE ADAPTIVE ARRAY PROCESSING

CROSS-REFERENCE TO RELATED APPLICATION

The present application is a continuation-in-part of U.S. patent application Ser. No. 11/699,732 filed Jan. 29, 2007 and entitled "System and Method For Utilizing Omni-Directional Microphones for Speech Enhancement," which claims priority to U.S. Provisional Patent Application No. 60/850,928, filed Oct. 10, 2006 entitled "Array Processing Technique for Producing Long-Range ILD Cues with Omni-Directional Microphone Pair," both of which are herein incorporated by reference. The present application is also related to U.S. patent application Ser. No. 11/343,524, entitled "System and Method for Utilizing Inter-Microphone Level Differences for Speech Enhancement," which claims the priority benefit of U.S. Provision Patent Application No. 60/756,826, filed Jan. 5, 2006, and entitled "Inter-Microphone Level Difference Suppressor," all of which are also herein incorporated by reference.

BACKGROUND OF THE INVENTION

1. Field of Invention

The present invention relates generally to audio processing and more particularly to adaptive array processing in close microphone systems.

2. Description of Related Art

Presently, there are numerous methods for reducing background noise in speech recordings made in adverse environments. One such method is to use two or more microphones on an audio device. These microphones may be in prescribed positions and allow the audio device to determine a level difference between the microphone signals. For example, due to a space difference between the microphones, the difference in times of arrival of the signals from a speech source to the microphones may be utilized to localize the speech source. Once localized, the signals can be spatially filtered to suppress the noise originating from different directions.

In order to take advantage of the level differences between two omni-directional microphones, a speech source needs to be closer to one of the microphones. Typically, this means that a distance from the speech source to a first microphone should be shorter than a distance from the speech source to a second microphone. As such, the speech source should remain in relative closeness to both microphones, especially if both microphones are in close proximity, as may be required, for example, in mobile telephony applications.

A solution to the distance constraint may be obtained by using directional microphones. The use of directional microphones allows a user to extend an effective level difference between the two microphones over a larger range with a narrow inter-microphone level difference (ILD) beam. This may be desirable for applications where the speech source is not in as close proximity to the microphones, such as in push-to-talk (PTT) or videophone applications.

Disadvantageously, directional microphones have numerous physical and economical drawbacks. Typically, directional microphones are large in size and do not fit well in small devices (e.g., cellular phones). Additionally, directional microphones are difficult to mount since these microphones require ports in order for sounds to arrive from a plurality of directions. Furthermore, slight variations in manufacturing may result in a microphone mismatch. Finally, directional microphones are costly. This may result in more expensive manufacturing and production costs. Therefore, there is a desire to utilize characteristics of directional microphones in an audio device, without the disadvantages of using directional microphones, themselves.

SUMMARY OF THE INVENTION

Embodiments of the present invention overcome or substantially alleviate prior problems associated with noise suppression in close microphone systems. In exemplary embodiments, primary and secondary acoustic signals are received by acoustic sensors. The acoustic sensors may comprise a primary and a secondary omni-directional microphone. The acoustic signals are then separated into frequency sub-band signals for analysis.

In exemplary embodiments, the frequency sub-band signals may then be used to simulate two directional microphone responses (e.g., cardioid signals). An adaptive equalization coefficient may be applied to sub-band signals of the secondary acoustic signal. In accordance with exemplary embodiments, the application of the adaptive equalization coefficient allows for correction of microphone mismatch. Specifically, with respect to some embodiments, the adaptive equalization coefficient will align a null of a backward-facing cardioid pattern to be directed towards a desired sound source. A forward-facing cardioid pattern and the backward-facing cardioid pattern are generated based on the sub-band signals.

Utilizing cardioid signals of the forward-facing cardioid pattern and backward-facing cardioid pattern, noise suppression may be performed. In various embodiments, an energy spectrum or power spectrum is determined based on the cardioid signals. An inter-microphone level difference may then be determined and used to approximate a noise estimate. Based in part on the noise estimate, a gain mask may be determined. This gain mask is then applied to the primary acoustic signal to generate a noise suppressed signal. The resulting noise suppressed signal is output.

DESCRIPTION OF EXEMPLARY EMBODIMENTS

The present invention provides exemplary systems and methods for adaptive array processing in close microphone systems. In exemplary embodiments, the close microphones used comprise omni-directional microphones. Simulated directional patterns (i.e., cardioid patterns) may be created by processing acoustic signals received from the microphones. The cardioid patterns may be adapted to compensate for microphone mismatch. In one embodiment, the adaptation may result in a null of a backward-facing cardioid pattern to be directed towards a desired audio source. The resulting signals from the adaptation may then be utilized in a noise suppression system and/or speech enhancement system.

Array processing (AP) technology relies on accurate phase and/or level match of the microphones to create the desired cardioid patterns. Without proper calibration, even a small phase mismatch between the microphones may cause serious deterioration of an intended directivity patterns which may in turn introduce distortion to an inter-microphone level difference (ILD) map and either produce speech loss or noise leakage at a system output. Calibration for phase mismatch is essential for current AP technology to work given observed mismatches in microphone responses inherent in the manufacturing processes. However, calibration of each microphone pair on a manufacturing line is very expensive. For these reasons, a technology that does not require manufacturing line calibration for each microphone pair is highly desirable.

Embodiments of the present invention may be practiced on any audio device that is configured to receive sound such as, but not limited to, cellular phones, phone handsets, headsets, and conferencing systems. While some embodiments of the present invention will be described in reference to operation on a cellular phone, the present invention may be practiced on any audio device.

Figure 1A:
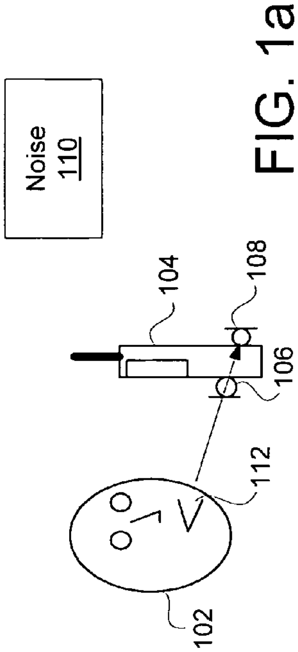
FIG. 1*a* and FIG. 1*b* are diagrams of two environments in which embodiments of the present invention may be practiced.

Referring to FIG. 1, an environment in which embodiments of the present invention may be practiced is shown. A user may provide an audio (speech) source 102 to an audio device 104. The exemplary audio device 104 may comprise two microphones: a primary microphone 106 relative to the audio source 102 and a secondary microphone 108 located a distance away from the primary microphone 106. In exemplary embodiments, the microphones 106 and 108 comprise omni-directional microphones.

While the microphones 106 and 108 receive sound (i.e., acoustic signals) from the audio source 102, the microphones 106 and 108 also pick up noise 110. Although the noise 110 is shown coming from a single location in FIG. 1, the noise 110 may comprise any sounds from one or more locations different than the audio source 102, and may include reverberations and echoes. The noise 110 may be stationary, non-stationary, and/or a combination of both stationary and non-stationary noise.

Exemplary embodiments of the present invention may utilize level differences (e.g., energy differences) between the acoustic signals received by the two microphones 106 and 108 independent of how the level differences are obtained. Ideally, the primary microphone 106 should be much closer to a mouth reference point (MRP) 112 of the audio source 102 than the secondary microphone 108 resulting in an intensity level that is higher for the primary microphone 106 and a larger energy level during a speech/voice segment. However, in accordance with the present invention, the audio source 102 is located a distance away from the primary and secondary microphones 106 and 108. For example, the audio device 104 may be a view-to-talk device (i.e., user watches a display on the audio device 104 while talking) or comprise a headset with short form factors. As such, the level difference between the primary and secondary microphones 106 and 108 may be very low.

Figure 1B:
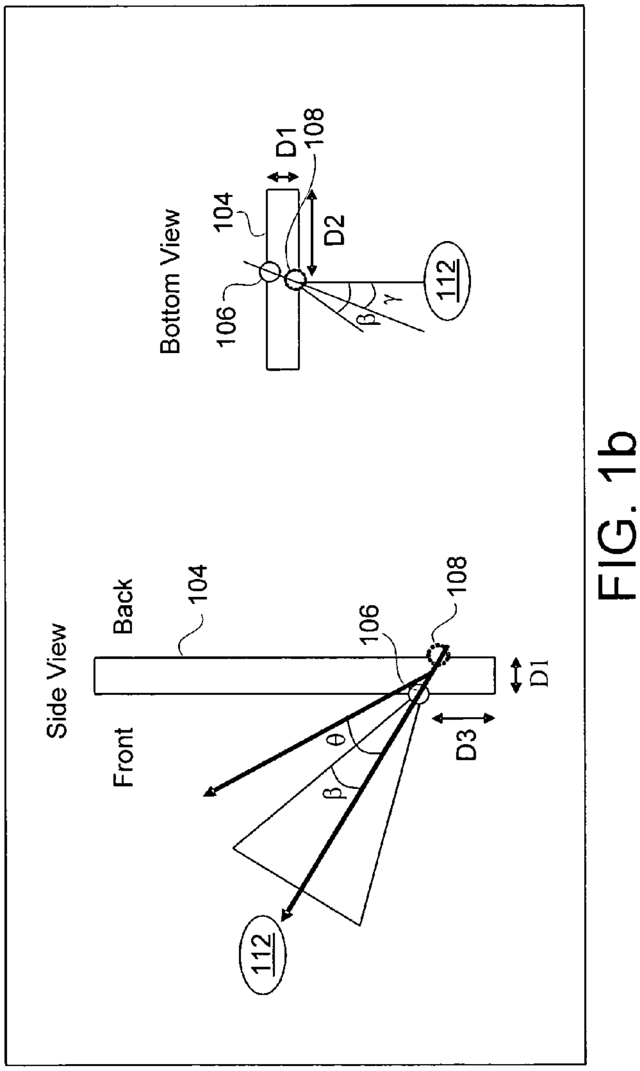

FIG. 1*b* illustrates positioning of the primary and secondary microphones 106 and 108 on the audio device 104, according to one embodiment. The primary and secondary microphone 106 and 108 may be located on a same axis as the MRP 112. A deviation from this audio source axis should not exceed β=25 degrees in any direction.

An angle θ defines a cone width, while an angle γ defines a deviation of the microphone array with respect to the MRP 112 direction. As such, γ may be constrained by an equation: $\gamma \leqq \theta - \beta$.

In exemplary embodiments, physical separation between the primary and secondary microphones 106 and 108 should be minimized. An approximate effective acoustic distance may be mathematically represented by:

$$D_{eff}=\min(D1+D2,\ D1+D3),$$

whereby for a narrowband system 0.5 cm<$D_{eff}$<4 cm and for a wideband system 1.0 cm<$D_{eff}$<2 cm.

Alternatively, the effective acoustic distance may be obtained by measuring the primary and secondary microphone 106 and 108 responses. Initially, a transfer function of a source at 0=0 degrees to each microphone 106 and 108 may be determined which may be represented as:

$$H_1(f)=|H_1(f)|e^{\phi 1(f)} \text{ and}$$

$$H_2(f)=|H_2(f)|e^{\phi 2(f)}.$$

An inter-microphone phase difference may be approximated by $\phi(f)=\phi_1(f)-\phi_2(f)$. As a result, the effective acoustic distance may be $$D_{eff} = -\phi_1(f)\frac{c}{2\pi f},$$

where c is the speed of sound in air.

Figure 2:
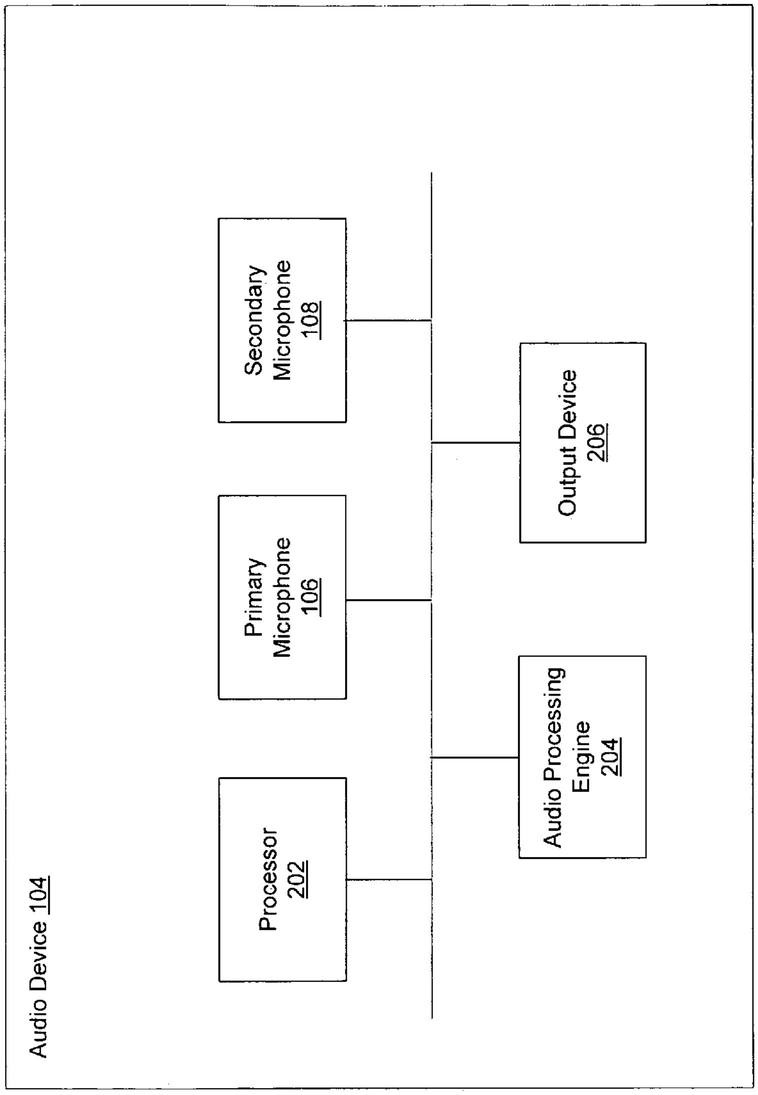
FIG. 2 is a block diagram of an exemplary audio device implementing embodiments of the present invention.

Referring now to FIG. 2, the exemplary audio device 104 is shown in more detail. In exemplary embodiments, the audio device 104 is an audio communication device that comprises a processor 202, the primary microphone 106, the secondary microphone 108, an audio processing engine 204, and an output device 206. The audio device 104 may comprise further components necessary for audio device 104 operations but not necessarily utilized with respect to embodiments of the present invention. The audio processing engine 204 will be discussed in more detail in connection with FIG. 3.

Upon reception by the microphones 106 and 108, the acoustic signals are converted into electric signals (i.e., a primary electric signal and a secondary electric signal). The electric signals may, themselves, be converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 108 is herein referred to as the secondary acoustic signal.

The output device 206 is any device which provides an audio output to the user. For example, the output device 206 may comprise an earpiece of a headset or handset, or a speaker on a conferencing device.

Figure 3:
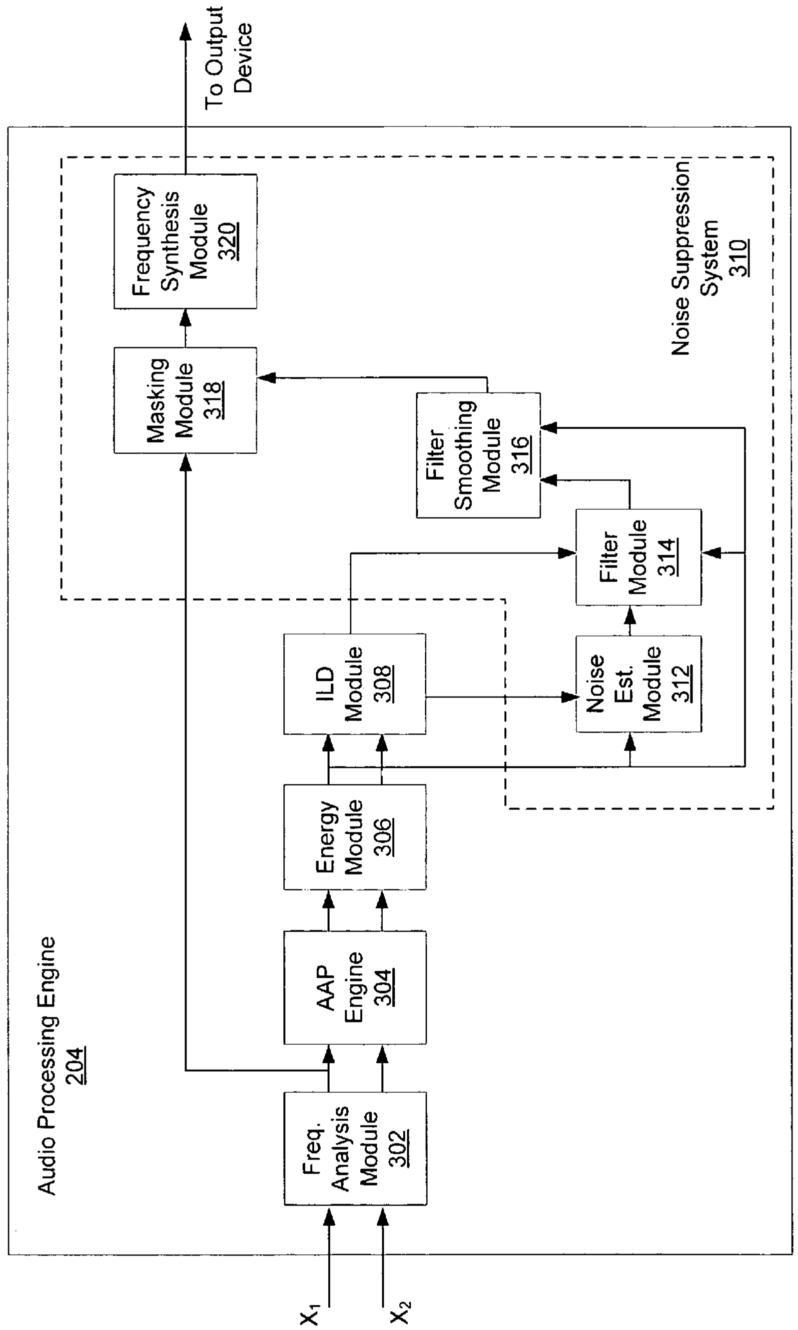
FIG. 3 is a block diagram of an exemplary audio processing engine.
Figure 4A:
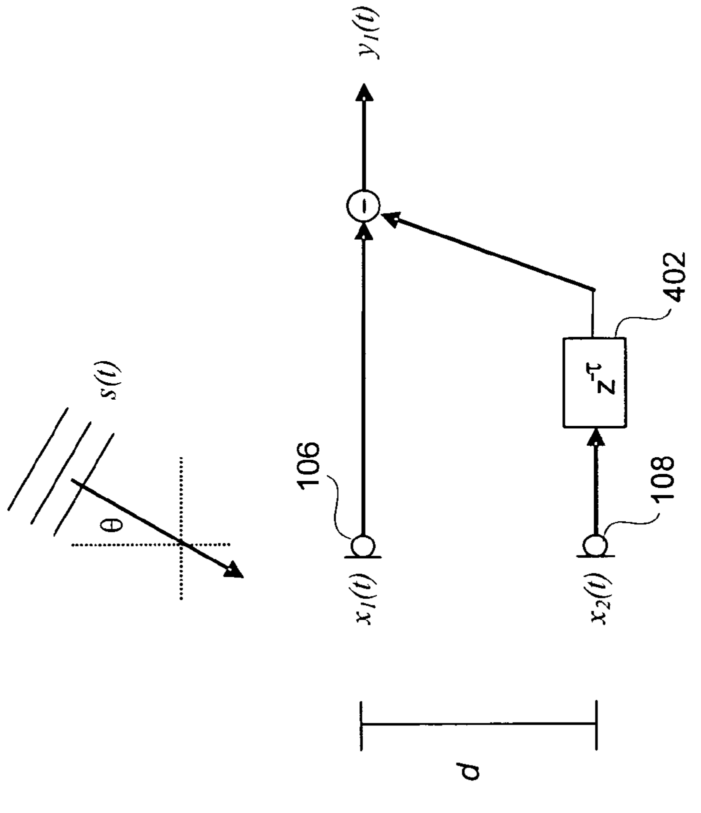
FIG. 4*a* and FIG. 4*b* are respective block diagrams of an exemplary structure of a differential array and an exemplary array processing module, according to some embodiments.
Figure 4B:
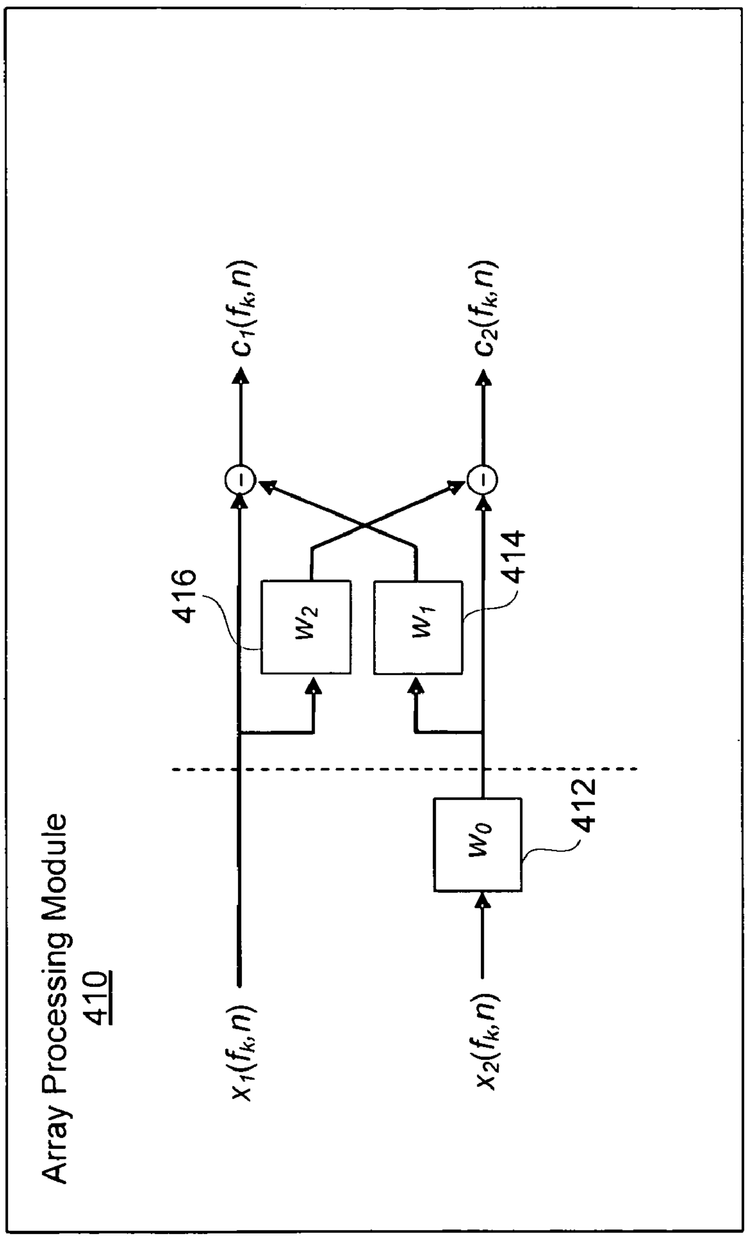

FIG. 3 is a detailed block diagram of the exemplary audio processing engine 204. In exemplary embodiments, the audio processing engine 204 is embodied within a memory device or storage medium. In operation, the acoustic signals received from the primary and secondary microphones 106 and 108 are converted to electric signals and processed through a frequency analysis module 302. In one embodiment, the frequency analysis module 302 takes the acoustic signals and mimics the frequency analysis of the cochlea (i.e., cochlear domain) simulated by a filter bank. In one example, the frequency analysis module 302 separates the acoustic signals into frequency sub-bands. A sub-band is the result of a filtering operation on an input signal, where the bandwidth of the filter is narrower than the bandwidth of the signal received by the frequency analysis module 302. Alternatively, other filters such as short-time Fourier transform (STFT), sub-band filter banks, modulated complex lapped transforms, cochlear models, wavelets, etc. can be used for the frequency analysis and synthesis. Because most sounds (e.g., acoustic signals) are complex and comprise more than one frequency, a sub-band analysis on the acoustic signal determines what individual frequencies are present in the complex acoustic signal during a frame (e.g., a predetermined period of time). According to one embodiment, the frame is 8 ms long. The results may comprise signals in a fast cochlea transform (FCT) domain.

Once the sub-band signals are determined, the sub-band signals are forwarded to an adaptive array processing (AAP) engine 304. The AAP engine 304 is configured to adaptively process the primary and secondary signals to create synthetic directional patterns (i.e., synthetic directional microphone responses) for the close microphone array (e.g., primary and secondary microphones 106 and 108). The directional patterns may comprise a forward-facing cardioid pattern based on the primary acoustic (sub-band) signal and a backward-facing cardioid pattern based on the secondary (sub-band) acoustic signal. In exemplary embodiments, the sub-band signals may be adapted such that a null of the backward-facing cardioid pattern is directed towards the audio source 102. The AAP engine 304 is configured to process the sub-band signals using two networks of first-order differential arrays. In essence, this processing replaces two cardioid or directional microphones with two omni-directional microphones.

Pattern generation using differential arrays (DA) requires use of fractional delays whose value may depend on a distance between the microphones. In the FCT domain, these patterns may be modeled and implemented by phase shifts on the sub-band signals (e.g., analytical signals from the microphones—ACS). As such, differential networks may be implemented in the FCT domain with two networks per tap (one network for each of the two cardioid patterns). Another advantage of implementing the DA in the FCT domain is that different fractional delays may be implemented in different frequency sub-bands. This may be important in systems where the distance between the microphones is frequency dependent (e.g., due to the phase distortions introduced by diffraction in real devices).

An exemplary structure of a differential array is shown in FIG. **4*a*. For sound arriving from a back of the array (θ=180 deg) an output $y_1(t)$ is zero if a delay line 402 introduces a delay equal to an acoustic delay between the primary and secondary microphones 106 and 108**. This may be represented by $$\tau = \frac{d}{c}$$

where c is the speed of sound in air (i.e., 340 m/s). For sound arriving from a front of the microphone array, the differential array acts as a differentiator for frequencies whose wavelength is large compared to the distance d between the two microphones 106 and 108 (e.g., an approximation error is less than 1 dB if the wavelength is **4*d***). For sources arriving from other directions, differentiator behavior is still present but additional broadband attenuation may be applied. The attenuation follows a "cardioid" pattern, which may be represented mathematically as $$\Delta(\theta) = \frac{1}{2}[1 + \cos(\theta)].$$

FIG. **4*b* illustrates an exemplary array processing module 410 utilizing a similar differential array structure. In exemplary embodiments, the array processing module 410 may be embodied within the AAP engine 304. The goal of the array processing module 410 is to implement two cardioid patterns, one facing front (i.e., forward-facing cardioid pattern) and one facing back (i.e., backward-facing cardioid pattern). In exemplary embodiments, two first-order differential arrays that share the same two microphones (i.e., the primary and secondary microphones 106 and 108**) are used. In one embodiment, the forward cardioid signal is assumed to be based on the primary acoustic signal, and may be mathematically represented by $$c_1(n,k)=x_1(n,k)-w_1 w_0 \cdot x_1(n,k),$$

where k is an index of a $k^{th}$ frequency tap, and n is a sample index. Similarly, the backward cardioid signal, assumed to be based on the secondary acoustic signal, may be mathematically represented by $$c_2(n,k)=x_2(n,k) \cdot w_0 - w_2 \cdot x_1(n,k).$$

$w_0$ comprises an equalization coefficient. In one embodiment, the equalization coefficient comprises a phase shift or time delay that aligns the two microphones 106 and 108 by modeling their phase mismatch. The equalization coefficient may be provided by an equalization module 412 In some embodiments, during array processing calibration, $w_0$ may be first obtained by least squares estimation and then applied to the secondary channel (i.e., channel processing the secondary acoustic signal) before estimating $w_1$ and $w_2$.

In exemplary embodiments, $w_1$ and $w_2$ comprise delay coefficients which are applied to create the cardioid signals and patterns. For a completely symmetrical acoustic setup with matched microphones 106 and 108, $w_1$=$w_2$, whereby $w_1$ and $w_2$ may be determined by assuming that the microphones are matched (e.g., offline and prior to manufacturing). However, in practice, the microphones 106 and 108 may have different phase characteristics requiring the coefficients be computed independently. In exemplary embodiments, a $w_1$ delay node 414 and a $w_2$ delay node 416 apply the coefficients ($w_1$ and $w_2$) to their respective acoustic signals in order to create the two cardioid patterns.

In accordance with exemplary embodiments, $w_1$ and $w_2$ may be derived from experimentation. For example, a signal may be recorded from various directions (e.g., front, back, and one side). The microphones are then matched and an analysis of the back and front signals is performed to determine $w_1$ and $w_2$. Thus, in exemplary embodiments, $w_1$ and $w_2$ may be constants set prior to manufacturing.

Referring back to FIG. 3, the cardioid signals (i.e., a signal implementing the forward-facing cardioid pattern and a signal implementing the backward-facing cardioid pattern) are then forwarded to the energy module 306 which computes energy (power) estimates or spectra associated with the cardioid signals. For simplicity, the following discussion assumes the forward-facing cardioid pattern is based on the sub-band signals from the primary microphone 106 and the backward-facing cardioid pattern are based on the sub-band signals from the secondary microphone 108. The power estimates are computed based on a cardioid primary signal ($c_1$) of the forward-facing cardioid and cardioid secondary signal ($c_2$) of a backward facing cardioid during an interval of time for each frequency band. The power estimate may be based on bandwidth of the cochlea channel and the cardioid signals. In one embodiment, the power estimate may be mathematically determined by squaring and integrating an absolute value of the frequency analyzed cardioid signals. For example, the energy level associated with the primary microphone signal may be determined by $$E_1(n,k)=\sum_{frame}|c_1(n,k)|^2,$$

and the energy level associated with the secondary microphone signal may be determined by $$E_2(n,k)=\sum_{frame}|c_2(n,k)|^2,$$

where n represents a time index (e.g., t=0, 1, . . . $N_{frame}$) and k represents a frequency index (e.g., k=0, 1, . . . K).

Given the calculated energy levels, an inter-microphone level difference (ILD) may be determined by an ILD module 308. The ILD may be determined by the ILD module 308 in a non-linear manner by taking a ratio of the energy levels. This may be mathematically represented by $$\mathrm{ILD}(n,k)=E_1(n,k)/E_2(n,k).$$

Applying the determined energy levels to this ILD equation results in $$ILD(n,k)=\frac{\sum_{frame}|c_1(n,k)|^2}{\sum_{frame}|c_2(n,k)|^2}.$$

The ILD between the outputs of the synthetic cardioids may establish a spatial map where the ILD is maximum in the front of the microphone array, and minimum in the back of the microphone array. The map is unambiguous in these two directions, so if the speech is known to be in either direction (generally in front) the noise suppression system 310 may use this feature to suppress noise from all other directions.

For a forward direction the ILD is, in theory, infinite, and extends to negative infinity in a backward direction. In practice, magnitudes squared of the cardioid signals may be averaged or "smoothed" over a frame to compute the ILD.

Iso-ILD regions may describe hyperboloids (e.g., cones if centers of the forward-facing and backward-facing cardioid patterns are assumed to be the same) around the axis of the array. Thus, only two directions have a one-to-one correspondence with the ILD function (i.e. is unique), front and back. The remaining directions comprise rotational ambiguity. This ambiguity is commonly known as "cones" of confusion. This ILD map is different from the ILD map obtained with spread microphones, where the ILD is maximum for near sources and zero otherwise. The desired speech source is assumed to have a maximum ILD.

Once the ILD is determined, the cardioid sub-band signals are processed through a noise suppression system 310. In exemplary embodiments, the noise suppression system 310 comprises a noise estimate module 312, a filter module 314, a filter smoothing module 316, a masking module 318, and a frequency synthesis module 320.

In exemplary embodiments, the noise estimate is based on the acoustic signal from the primary microphone 106 (e.g., forward-facing cardioid signal). The exemplary noise estimate module 312 is a component which can be approximated mathematically by $$N(n,k)=\lambda_1(n,k)E_1(n,k)+(1-\lambda_1(n,k))\min[N(n-1,k),E_1(n,k)]$$

according to one embodiment of the present invention. As shown, the noise estimate in this embodiment is based on minimum statistics of a current energy estimate of the primary acoustic signal, $E_1$(n,k) and a noise estimate of a previous time frame, N(n−1, k). As a result, the noise estimation is performed efficiently and with low latency.

$\lambda_1$(n,k) in the above equation is derived from the ILD approximated by the ILD module 308, as $$\lambda_I(n,k)=\begin{cases}\approx 0 & \text{if } ILD(n,k)<threshold\\ \approx 1 & \text{if } ILD(n,k)>threshold\end{cases}$$

That is, when ILD is smaller than a threshold value (e.g., threshold=0.5) above which desired sound is expected to be, $\lambda_1$ is small, and thus the noise estimate module 312 follows the noise closely. When ILD starts to rise (e.g., because speech is present within the large ILD region), $\lambda_1$ increases. As a result, the noise estimate module 312 slows down the noise estimation process and the desired sound energy does not contribute significantly to the final noise estimate. Therefore, some embodiments of the present invention may use a combination of minimum statistics and desired sound detection to determine the noise estimate.

A filter module 314 then derives a filter estimate based on the noise estimate. In one embodiment, the filter is a Wiener filter. Alternative embodiments may contemplate other filters. Accordingly, the Wiener filter may be approximated, according to one embodiment, as $$W=\left(\frac{P_s}{P_s+P_n}\right)^{\varphi},$$

where $P_s$ is a power spectral density of speech or desired sound, and $P_n$ is a power spectral density of noise. According to one embodiment, $P_n$ is the noise estimate, N(n,k), which is calculated by the noise estimate module 312. In an exemplary embodiment, $P_s=E_1(n,k)-\gamma N(n,k)$, where $E_1$(n,k) is the energy estimate associated with the primary acoustic signal (e.g., the cardioid primary signal) calculated by the energy module 306, and N(n,k) is the noise estimate provided by the noise estimate module 312. Because the noise estimate may change with each frame, the filter estimate may also change with each frame.

$\gamma$ is an over-subtraction term which is a function of the ILD. $\gamma$ compensates bias of minimum statistics of the noise estimate module 312 and forms a perceptual weighting. Because time constants are different, the bias will be different between portions of pure noise and portions of noise and speech. Therefore, in some embodiments, compensation for this bias may be necessary. In exemplary embodiments, $\gamma$ is determined empirically (e.g., 2-3 dB at a large ILD, and is 6-9 dB at a low ILD).

$\phi$ in the above exemplary Wiener filter equation is a factor which further limits the noise estimate. $\phi$ can be any positive value. In one embodiment, non-linear expansion may be obtained by setting $\phi$ to 2. According to exemplary embodiments, $\phi$ is determined empirically and applied when a body of $$W = \left(\frac{P_s}{P_s + P_n}\right)$$

falls below a prescribed value (e.g., 12 dB down from the maximum possible value of W, which is unity).

Because the Wiener filter estimation may change quickly (e.g., from one frame to the next frame) and noise and speech estimates can vary greatly between each frame, application of the Wiener filter estimate, as is, may result in artifacts (e.g., discontinuities, blips, transients, etc.). Therefore, an optional filter smoothing module 316 is provided to smooth the Wiener filter estimate applied to the acoustic signals as a function of time. In one embodiment, the filter smoothing module 316 may be mathematically approximated as $$M(n,k)=\lambda_s(n,k)W(n,k)+(1-\lambda_s(n,k))M(n-1,k),$$

where $\lambda_s$ is a function of the Wiener filter estimate and the primary microphone energy, $E_1$.

As shown, the filter smoothing module 316, at time-sample n will smooth the Wiener filter estimate using the values of the smoothed Wiener filter estimate from the previous frame at time (n−1). In order to allow for quick response to the acoustic signal changing quickly, the filter smoothing module 316 performs less smoothing on quick changing signals, and more smoothing on slower changing signals. This is accomplished by varying the value of $\lambda_s$ according to a weighed first order derivative of $E_1$ with respect to time. If the first order derivative is large and the energy change is large, then $\lambda_s$ is set to a large value. If the derivative is small then $\lambda_s$ is set to a smaller value.

After smoothing by the filter smoothing module 316, the primary acoustic signal is multiplied by the smoothed Wiener filter estimate to estimate the speech. In the above Wiener filter embodiment, the speech estimate is approximated by $S(n,k)=c_1(n,k)\ M(n,k)$, where $c_1(n,k)$ is the cardioid primary signal. In exemplary embodiments, the speech estimation occurs in the masking module 318.

Next, the speech estimate is converted back into time domain from the cochlea domain. The conversion comprises taking the speech estimate, S(n,k), and adding together the phase shifted signals of the cochlea channels in a frequency synthesis module 320. Alternatively, the conversion comprises taking the speech estimate, S(n,k), and multiplying this with an inverse frequency of the cochlea channels in the frequency synthesis module 320. Once conversion is completed, the signal is output to the user.

It should be noted that the system architecture of the audio processing engine 204 of FIG. 3 and the array processing module 410 of FIG. **4*b* is exemplary. Alternative embodiments may comprise more components, less components, or equivalent components and still be within the scope of embodiments of the present invention. Various modules of the audio processing engine 204 may be combined into a single module. For example, the functions of the ILD module 308 may be combined with the functions of the energy module 306. As a further example, the functionality of the filter module 314 may be combined with the functionality of the filter smoothing module 316**.

Figure 5:
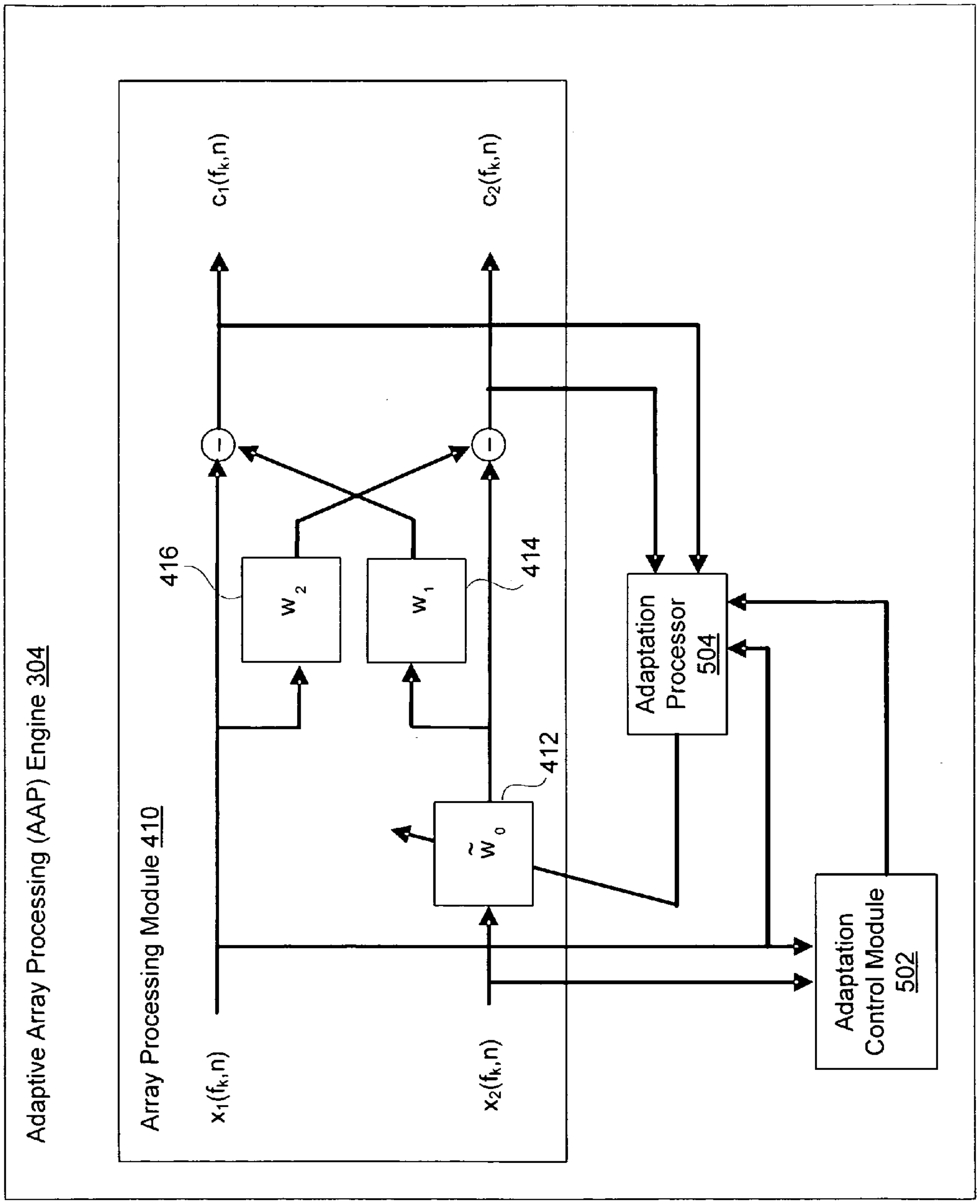
FIG. 5 is a block diagram of an exemplary adaptive array processing engine.

Referring now to FIG. 5, the exemplary AAP engine 304 is shown in more detail. In exemplary embodiments, the AAP engine 304 comprises the array processing module 410. However, the equalization module 412 applies an adaptive equalization coefficient determined based on an adaptation control module 502 and an adaptation processor 504. The equalization coefficient is configured to compensate for microphone mismatch post-manufacturing.

The exemplary adaptation control module 502 is configured to operate as a switch to activate the adaptation processor 504, which will adjust the equalization coefficient. In one embodiment, the adaptation may be triggered by identifying frames dominated by speech using a fixed (non-adaptive) close-microphone array derived from the primary sub-band signal ($x_1(k,n)$) and secondary sub-band signal ($x_2(k,n)$). This second array comprises the same structure as discussed in connection with FIG. **4*b* but without the adaptive coefficient $w_0$. The coefficients $w_1$ and $w_2$ of this array include the phase shifts due to acoustical properties of the audio device 104 and exclude particular microphone properties. The power ratio between the front-facing and back-facing cardioid signals produced by this array may be tracked and used to determine if a signal is active in the forward direction, in which case the adaptive equalization coefficient can be updated. In some embodiments, the equalization coefficient is only adapted for taps with high signal-to-noise ratio (SNR). Thus, the adaptation control module 502 may look for both a signal and proper direction. Adaptation may be performed when the probability that the observed components correspond to speech coming from the desired direction (e.g., from the front direction). In these situations, the adaptation control module 502 may have a value of one. However, if a weak signal or no signal is being received from the front/forward direction, then the value from the adaption control module 502 may be zero. If adaptation is determined to be required, then the adaptation control module 502 sends instructions to the adaptation processor 504**.

The exemplary adaptation processor 504 is configured to adjust the equalization coefficient such that a desired speech signal is cancelled by a backward-facing cardioid pattern. When the adaptation control module 502 indicates there is a desired signal coming from the front/forward direction (i.e., value=1), the adaptation processor 504 adapts the equalization coefficient to essentially cancel the desired signal in order to create a zero or null in that direction. The adaptation may be performed for each input sample, per frame, or in a batch.

In exemplary embodiments, the adaptation is performed using a normalized least mean square (NLMS) algorithm having a small step size. NLMS may, in accordance with one embodiment, minimize a square of a calculated error. The error may be mathematically determined as $E=x_1-x_2\cdot w_2\cdot w_2$, in accordance with one embodiment. Thus, by setting the derivative of $E^2$ to 0, $w_0$ may be determined. The output of the adaptation processor 504 (i.e., $w_0$) is then provided to the adaptive equalization module 412. It should be noted that the magnitude of $w_0$ is kept to a value of one, in exemplary embodiments. This may cause the convergence to occur faster. The equalization module 412 may then apply the equalization coefficient to the secondary sub-band signal.

Figure 6:
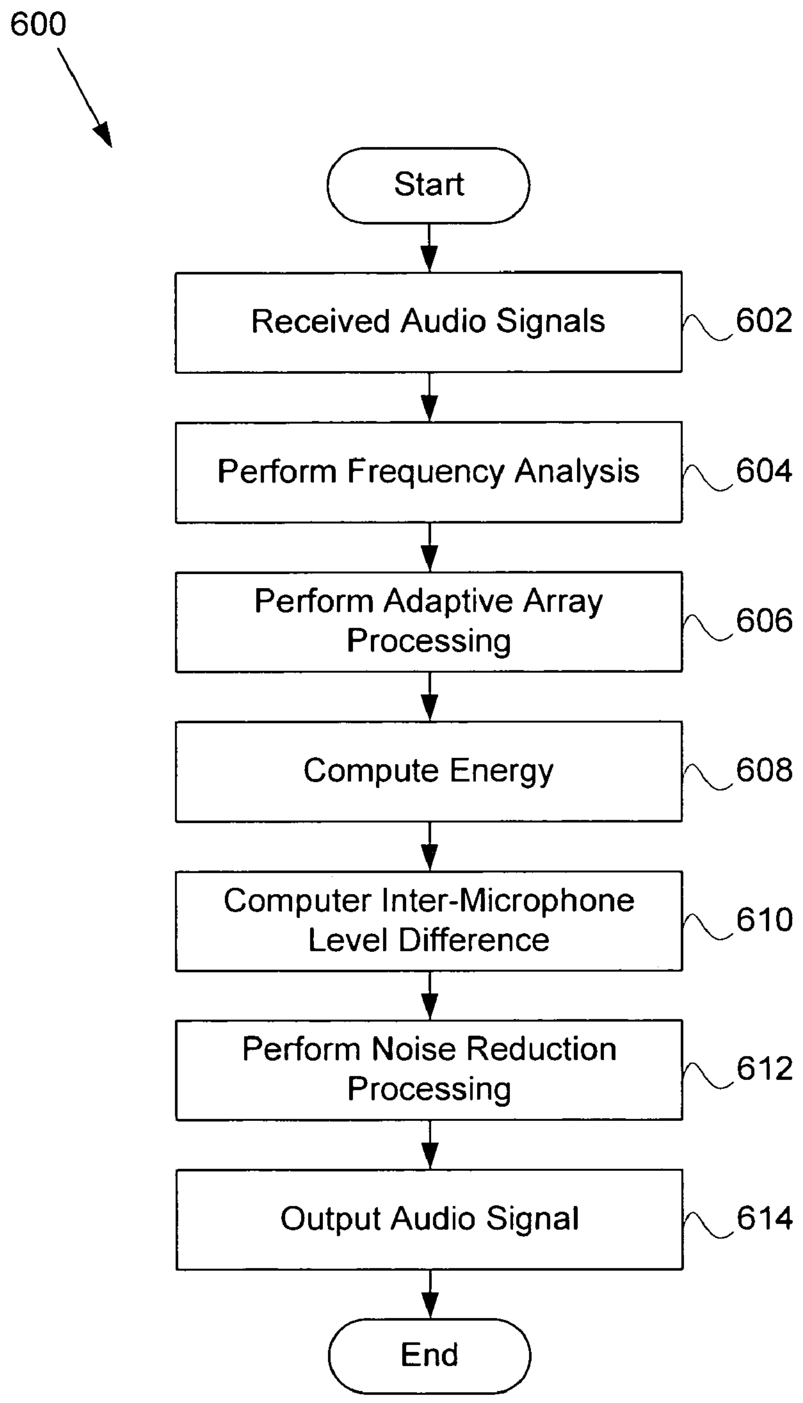
FIG. 6 is a flowchart of an exemplary method for providing noise suppression in an audio device having a close microphone array.

FIG. 6 is a flowchart 600 of an exemplary method for providing noise suppression and/or speech enhancement with close microphones. In step 602, acoustic signals are received by the primary microphone 106 and the secondary microphone 108. In exemplary embodiments, the microphones are omni-directional microphones in close proximity to each other compared to the audio source 102. In some embodiments, the acoustic signals are converted by the microphones to electronic signals (i.e., the primary electric signal and the secondary electric signal) for processing.

In step 604, the frequency analysis module 302 performs frequency analysis on the primary and secondary acoustic signals. According to one embodiment, the frequency analysis module 302 utilizes a filter bank to determine frequency sub-bands for the primary and secondary acoustic signals.

In step 606, adaptive array processing is then performed on the sub-band signals by the AAP engine 304. In exemplary embodiments, the AAP engine 304 is configured to determine the cardioid primary signal and the cardioid secondary signal by delaying, subtracting, and applying an equalization coefficient to the acoustic signals captured by the primary and secondary microphones 106 and 108. Step 606 will be discussed in more detail in connection with FIG. 7.

In step 608, energy estimates for the cardioid primary and secondary signals are computed. In one embodiment, the energy estimates are determined by the energy module 306. In one embodiment, the energy module 306 utilizes a present cardioid signal and a previously calculated energy estimate to determine the present energy estimate of the present cardioid signal.

Once the energy estimates are calculated, inter-microphone level differences (ILD) may be computed in step 610. In one embodiment, the ILD is calculated based on a non-linear combination of the energy estimates of the cardioid primary and secondary signals. In exemplary embodiments, the ILD is computed by the ILD module 308.

Once the ILD is determined, the cardioid primary and secondary signals are processed through a noise suppression system in step 612. Based on the calculated ILD and cardioid primary signal, noise may be estimated. A filter estimate may then computed by the filter module 314. In some embodiments, the filter estimate may be smoothed. The smoothed filter estimate is applied to the acoustic signal from the primary microphone 106 to generate a speech estimate. The speech estimate is then converted back to the time domain. Exemplary conversion techniques apply an inverse frequency of the cochlea channel to the speech estimate.

Once the speech estimate is converted, the audio signal may now be output to the user in step 614. In some embodiments, the electronic (digital) signals are converted to analog signals for output. The output may be via a speaker, earpieces, or other similar devices.

Figure 7:
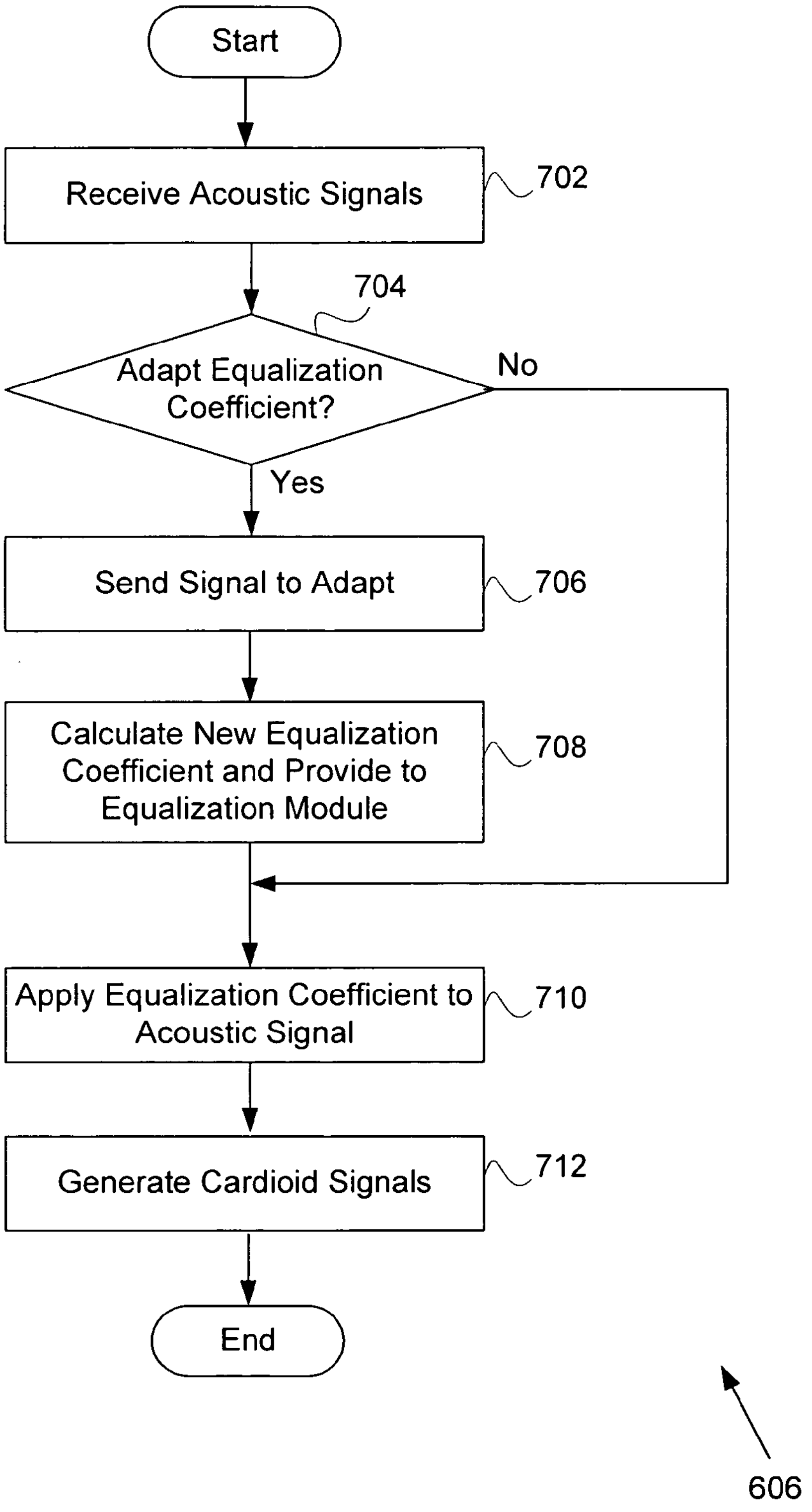
FIG. 7 is a flowchart of an exemplary method for performing adaptive array processing.

Referring now to FIG. 7, a flowchart of an exemplary method for performing adaptive array processing (step 606) is shown. In operation, microphones (e.g., microphones 106 and 108) of the microphone array may be mismatched. As such, the adaptive array processing (AAP) engine 304 adaptively updates the equalization coefficient applied by the array processing module 410 to compensate for the microphone mismatch. In step 702, the acoustic signals are received by the AAP engine 304. In exemplary embodiments, the acoustic signals comprise sub-band signals post-processing by the frequency analysis module 302.

In step 704, a determination is made as to whether to adapt the equalization coefficient. In exemplary embodiments, the adaptation control module 502 analyzes the sub-band signals to determine if adaptation may be needed. The analysis may comprise, for example, determining if energy is high in a front direction of the microphone array.

If adaptation is required, then an adaptation signal is sent in step 706. In exemplary embodiments, the adaptation control module 502 will send the adaptation signal to the adaptation processor 504.

The adaptation processor 504 then calculates a new equalization coefficient in step 708. In one embodiment, the adaptation is performed using a normalized least mean square (NLMS) algorithm having a small step size and no regularization. NLMS may, in accordance with one embodiment, minimize a square of a calculated error. The new equalization coefficient is then provided to the equalization module 412.

In step 710, the equalization coefficient is applied to the acoustic signal. In exemplary embodiments, the equalization coefficient may be applied to one or more sub-bands of the secondary acoustic signal to generate an equalized sub-band signal.

The cardioid signals are then generated in step 712. In various embodiments, the equalized sub-band signal along with the sub-band signal from the primary acoustic microphone 106 are delayed via delay nodes 414 and 416, respectively. The results may then be subtracted from the opposite sub-band signal to obtain the cardioid signals.

The above-described modules can be comprised of instructions that are stored on storage media. The instructions can be retrieved and executed by the processor 202. Some examples of instructions include software, program code, and firmware. Some examples of storage media comprise memory devices and integrated circuits. The instructions are operational when executed by the processor 202 to direct the processor 202 to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. For example, the microphone array discussed herein comprises a primary and secondary microphone 106 and 108. However, alternative embodiments may contemplate utilizing more microphones in the microphone array. Therefore, these and other variations upon the exemplary embodiments are intended to be covered by the present invention.

The invention claimed is:

1. A method for adaptive processing of a close microphone array in a noise suppression system, comprising:

receiving a primary acoustic signal and a secondary acoustic signal;

performing frequency analysis on the primary and secondary acoustic signals to obtain primary and secondary sub-band signals;

applying an adaptive equalization coefficient to a secondary sub-band signal;

generating a forward-facing cardioid pattern and a backward-facing cardioid pattern based on the sub-band signals;

utilizing cardioid signals of the forward-facing cardioid pattern and backward-facing cardioid pattern to perform noise suppression; and outputting a noise suppressed signal.

2. The method of claim 1 further comprising determining whether to adapt the adaptive equalization coefficient.

3. The method of claim 2 wherein determining whether to adapt comprises verifying if a desired sound is present in a forward direction of a second non-adaptive close microphone array.

4. The method of claim 2 wherein determining whether to adapt comprises verifying if a desired sound is present in a forward direction of the close microphone array.

5. The method of claim 4 wherein verifying is based on energy level of the acoustic signals.

6. The method of claim 4 wherein verifying is based on signal-to-noise ratio of the acoustic signals.

7. The method of claim 1 further comprising adapting the adaptive equalization coefficient.

8. The method of claim 7 wherein adapting comprises determining an error and applying a normalized least mean square function to the error to determine a new adaptive equalization coefficient.

9. The method of claim 1 wherein utilizing the cardioid signals to perform noise suppression comprises determining an energy spectrum for each cardioid signal.

10. The method of claim 1 wherein utilizing the cardioid signals to perform noise suppression comprises determining an inter-microphone level difference between the cardioid signals of the forward-facing and backward-facing cardioid patterns.

11. The method of claim 1 wherein utilizing the cardioid signals to perform noise suppression comprises determining a noise estimate based in part on the cardioid signals.

12. The method of claim 11 further comprising determining a gain mask based in part on the noise estimate.

13. The method of claim 12 further comprising applying the gain mask to the primary acoustic signal to suppress noise.

14. A system for adaptive processing of a close microphone array in a noise suppression system, comprising:

a frequency analysis module configured to perform frequency analysis on primary and secondary acoustic signals to obtain primary and secondary sub-band signals;

an adaptive array processing engine configured to apply an adaptive equalization coefficient to a secondary sub-band signal and to generate a forward-facing cardioid pattern and a backward-facing cardioid pattern based on the sub-band signals;

a noise suppression system configured to use cardioid signals of the forward-facing cardioid pattern and backward-facing cardioid pattern to perform noise suppression; and an output device configured to output a noise suppressed signal.

15. The system of claim 14 wherein the adaptive array processing engine comprises an adaptation control configured to determine whether to adapt the adaptive equalization coefficient.

16. The system of claim 14 wherein the adaptive array processing engine comprises an adaptation processor configured to determine a new adaptive equalization coefficient.

17. The system of claim 14 wherein the noise suppression system comprises an inter-microphone level difference module configured to determine an inter-microphone level difference between the cardioid signals of the forward-facing and backward-facing cardioid patterns.

18. The system of claim 14 wherein the noise suppression system comprises a noise estimate module configured to determine a noise estimate based in part on the cardioid signals.

19. The system of claim 18 wherein the noise suppression system comprises a filter module configured to determine a gain mask based in part on the noise estimate.

20. The method of claim 19 wherein the noise suppression system comprises a masking module configured to apply the gain mask to the primary acoustic signal to suppress noise.

21. A machine readable medium having embodied thereon a program, the program providing instructions for a method for adaptive processing of a close microphone array in a noise suppression system, comprising:

receiving a primary acoustic signal and a secondary acoustic signal;

performing frequency analysis on the primary and secondary acoustic signals to obtain primary and secondary sub-band signals;

applying an adaptive equalization coefficient to a secondary sub-band signal;

generating a forward-facing cardioid pattern and a backward-facing cardioid pattern based on the sub-band signals;

utilizing cardioid signals of the forward-facing cardioid pattern and backward-facing cardioid pattern to perform noise suppression; and outputting a noise suppressed signal.

* * * * *